US011623787B2

(12) United States Patent
Hon et al.

(10) Patent No.: US 11,623,787 B2
(45) Date of Patent: *Apr. 11, 2023

(54) INTERLOCKING REUSABLE SPILL-PROOF CONTAINERS

(71) Applicant: KEEP YOUR CADENCE, INC., Lewes, DE (US)

(72) Inventors: Stephanie Justine Hon, Bedford Hills, NY (US); Hadley Earl Allen, Falmouth, ME (US)

(73) Assignee: KEEP YOUR CADENCE, INC., Lewes, DE (US)

( * ) Notice: Subject to any disclaimer, the term of this patent is extended or adjusted under 35 U.S.C. 154(b) by 46 days.

This patent is subject to a terminal disclaimer.

(21) Appl. No.: 16/948,710

(22) Filed: Sep. 29, 2020

(65) Prior Publication Data

US 2021/0061515 A1 Mar. 4, 2021

Related U.S. Application Data

(63) Continuation of application No. 16/687,103, filed on Nov. 18, 2019, now Pat. No. 10,822,143.

(60) Provisional application No. 62/768,580, filed on Nov. 16, 2018.

(51) Int. Cl.
*B65D 21/02* (2006.01)
*A45D 40/24* (2006.01)

(52) U.S. Cl.
CPC ......... *B65D 21/0228* (2013.01); *A45D 40/24* (2013.01)

(58) Field of Classification Search
CPC .............. B65D 21/0228; B65D 21/021; B65D 21/0209; B65D 21/0234; B65D 21/0201; B65D 21/0212; B65D 21/00; B65D 21/0223; B65D 23/08; B65D 23/0857; B65D 39/08; B65D 41/04; B65D 81/3205; A45D 40/24; B05B 11/3059
USPC ........................................................ 222/135
See application file for complete search history.

(56) References Cited

U.S. PATENT DOCUMENTS

| 2,326,414 A | * | 8/1943 | Thompson | B65D 25/20 220/4.27 |
| 2,645,375 A | * | 7/1953 | Topfer | B65D 21/00 220/4.27 |
| 2,940,589 A | * | 6/1960 | Silverman | A45C 11/005 220/4.27 |
| 3,485,416 A | * | 12/1969 | Fohrman | A47G 19/24 D9/503 |
| 4,474,303 A | * | 10/1984 | Maccise | A47J 47/14 220/4.27 |
| 5,299,700 A | * | 4/1994 | Beniacar | B65D 23/0857 220/23.91 |

(Continued)

OTHER PUBLICATIONS https://www.muji.us/store/acrylic-storage-small-item-container-9cmx9-7cm-4550002868451.html Muji Online Store, Date accessed: Feb. 6, 2020.

(Continued)

*Primary Examiner* — Benjamin R Shaw
(74) *Attorney, Agent, or Firm* — Amster, Rothstein & Ebenstein LLP (57) ABSTRACT

An interlocking reusable spill-proof container is disclosed. More particularly, an interlocking reusable spill-proof travel bottle that can house a cosmetic or personal care product, or separately house multiple cosmetics or personal care products is disclosed.

7 Claims, 8 Drawing Sheets

(56) References Cited

U.S. PATENT DOCUMENTS

| | | | | |
|---|---|---|---|---|
| 5,422,129 | A * | 6/1995 | Draddy | B65D 21/08 220/4.26 |
| 5,503,281 | A * | 4/1996 | Bergner | B65D 5/5002 227/89 |
| 5,968,616 | A * | 10/1999 | Kakemura | B65D 1/0215 428/903.3 |
| 6,145,685 | A * | 11/2000 | Dick | B65D 21/0228 220/23.91 |
| 8,113,369 | B2 * | 2/2012 | Mast | B65D 1/44 215/381 |
| 2003/0160071 | A1 * | 8/2003 | Moore | B05B 11/3018 222/321.7 |
| 2007/0039849 | A1 * | 2/2007 | Rodriguez | B65D 5/4262 206/457 |
| 2007/0138176 | A1 * | 6/2007 | Gawlick | A47J 47/08 220/4.26 |
| 2007/0290002 | A1 * | 12/2007 | Schmitz | B05B 15/652 222/321.7 |
| 2009/0223999 | A1 * | 9/2009 | Hill | B65D 81/3205 222/129 |
| 2012/0211503 | A1 * | 8/2012 | LaFaver | B65D 81/3876 220/676 |
| 2013/0092693 | A1 * | 4/2013 | Brennan | B65D 21/083 220/500 |
| 2013/0200107 | A1 * | 8/2013 | Presche | B05B 11/3052 222/384 |
| 2013/0221002 | A1 * | 8/2013 | Chen | B65D 43/0212 220/200 |
| 2014/0020706 | A1 * | 1/2014 | Thiebaut | A45D 40/0075 132/314 |
| 2014/0238949 | A1 * | 8/2014 | Patel | B65D 81/3205 215/6 |
| 2014/0291278 | A1 * | 10/2014 | Colin | B65D 25/00 53/411 |
| 2015/0273503 | A1 * | 10/2015 | Drugeon | B65D 83/56 222/1 |
| 2016/0046421 | A1 * | 2/2016 | Brown | B65D 47/06 222/545 |
| 2016/0137345 | A1 * | 5/2016 | Grodsky | A61C 1/082 206/505 |
| 2017/0057694 | A1 * | 3/2017 | Moore | B65D 21/0209 |
| 2017/0233136 | A1 * | 8/2017 | Cartledge | B65D 21/0228 222/130 |
| 2018/0179083 | A1 * | 6/2018 | Cooper | F25D 23/126 |
| 2018/0368623 | A1 * | 12/2018 | Cerasani | B65D 51/24 |
| 2019/0281952 | A1 * | 9/2019 | Meranus | A45D 34/042 |
| 2019/0337675 | A1 * | 11/2019 | Rajendran | B65D 81/3823 |
| 2020/0017257 | A1 * | 1/2020 | Mefford | B65D 1/0223 |
| 2020/0037729 | A1 * | 2/2020 | Reid | B65D 43/0231 |

OTHER PUBLICATIONS https://www.muji.us/store/acrylic-storage-small-item-container-slim-7cmx9-7cm-4550002868444.html Muji Online Store, Date accessed: Feb. 6, 2020.

https://www.amazon.com/Nalgene-Travel-Kit-Small- Clear/dp/B00BISNAM8 Nalgene bottles, Amazon Online Store, Date accessed: Feb. 6, 2020.

http://www.humangear.com/gear/gotoob Humangear Online Store, Date accessed: Feb. 6, 2020.

https://www.amazon.com/s/ref=nb_sb_noss_1?url=search-alias%3Daps&field-keywords=travel+bottles Brandless bottles, Amazon Online Store, Date accessed: Feb. 6, 2020.

https://juvitus.com/collections/standard-refillable-airless Juvitus Online Store, Date accessed: Feb. 6, 2020.

* cited by examiner

INTERLOCKING REUSABLE SPILL-PROOF CONTAINERS

CLAIM OF PRIORITY

This application is a continuation of U.S. Non-Provisional patent application Ser. No. 16/687,103 entitled "Interlocking Reusable Spill-proof Containers" filed on Nov. 18, 2019, which claims priority to U.S. Provisional Patent Application No.: 62/768,580, filed on Nov. 16, 2018, entitled "DEVICES AND METHODS FOR MAKING AND USING REUSABLE, SPILL-PROOF BOTTLES FOR SINGLE AND MULTIPLE TYPES AND QUANTITIES OF PERSONAL CARE PRODUCTS", the contents of both of which are hereby incorporated by reference in their entirety.

NOTICE OF COPYRIGHTS AND TRADE DRESS

A portion of the disclosure of this patent document contains material which is subject to copyright or trade dress protection. This patent document may show and/or describe matter that is or may become trade dress of the owner. The copyright and trade dress owner has no objection to the facsimile reproduction by anyone of the patent disclosure, as it appears in the Patent and Trademark Office patent files or records, but otherwise reserves all copyright and trade dress rights whatsoever.

FIELD OF THE EMBODIMENTS

The present disclosure relates generally to an interlocking reusable spill-proof container. More particularly, the present disclosure relates to an interlocking reusable spill-proof travel bottle that can house a cosmetic or personal care product, or separately house multiple cosmetics or personal care products, depending on the embodiment.

BACKGROUND

When people travel, often they need to bring toiletries, cosmetics, and other items with them. However, travelers are often prohibited from merely bringing these items with them due to Transportation Security Administration regulations, which limit the quantities in which these items can be brought. Compounding this problem is the limited space that travelers have to pack their items, creating a need to efficiently transport their items. While many plastics can be used to address this problem, in today's ecological climate, there is a strong desire to limit the amount of single-use plastics which can cause great damage to the environment. Moreover, merely purchasing toiletries and cosmetics once travelers have arrived and disposing of them prior to their return creates undue waste, further damaging the environment.

Additionally, only a small fraction of brands offer travel-size toiletries and cosmetics, limiting the options available to travelers. Further, these travel bottles are often poorly constructed and are prone to leaking or breaking. Luxury toiletries made with precious ingredients are also available, creating a need for devices that easily allow for complete use of products and that prevent loss and waste of these materials.

While refillable travel bottles do exist, they are separate, individual bottles that have no method of connecting to each other. The only way for the travel bottles on the market to connect is through a secondary method, a mechanism not one with the bottle but an external connector such as a bag, which has its own limitations of size, quality, and material. Current travel bottles on the market have sizes ranging from 1 oz to 3.4 oz. These sizes do not account for transferring more concentrated products, such as serums into these bottles.

Due to the aforementioned limitations, consumers often choose to bring their full-sized product bottles with them which often leak, take up unnecessary space, and add additional weight in a situation where every pound counts.

Existing travel bottles on the market are often square, rectangular, round, or some combination thereof. However, the rounded products waste space when combined, and when square or rectangle containers are used in odd amounts, the collection is an awkward shape, making it difficult to pack and transport. There is a need for travel bottles on the market that make well-organized odd numbered sets for travel, storage, and use. Moreover, containers of different shapes and size can easily separate and become lost in a bag, preventing the user from quickly finding a given containers; a maddening process.

Another limitation of existing travel bottles is that it is challenging, if not impossible, for users to use all of a viscous liquid product stored in such bottles. Too often the necks of these products are too small, the bottle shapes and interior surfaces often prohibit full product removal. Further, the viscosity of the product can prevent gravity or positive pressure to remove all of the stored product, and pumps typically don't reach all the way to the bottom of these containers. Particularly when products are precious or the consumer needs this "last drop" on a trip or right at that moment, this is very frustrating for the consumer. Wasted personal care products also often end up in the water system and can impact the environment negatively. There is a need for consumers to be able to access all their product when they want to, and easily, in ways that do not hurt the environment.

Travel containers can often be translucent, suggesting or revealing what product is inside. In various situations such as a business trip, late night at work, spending a night at a significant others, one can feel uncomfortable with their personal care routine being unintentionally transparent, providing a need for quality, opaque travel containers. Material that is not durable can break, which wastes product, money, and time. This can also create a dangerous situation as broken pieces of material can remain on the floor, which can be especially difficult to navigate in contexts in which products are normally used in, such as showers.

SUMMARY

The present disclosure provides for an interlocking reusable spill-proof container. In one embodiment, the container has a petri and a cap, and some embodiments also feature a center. That is, embodiments can exist utilizing only a petri and cap, while others exist utilizing a petri, a center, and a cap as defined by the current disclosure.

The petri is constructed out of a body and a jacket, where the body has a cavity which is bounded by a top opening on the body, a bottom of the body, and a plurality of walls that extend between the top opening and the body, which form a number of attachment points. The top opening is equipped with a first attachment mechanism which is used to provide for the releasable attachment to the center. The jacket has a floor, a top hole, and a plurality of edges extending between the two, where the plurality of edges for a plurality of receiving points. The jacket is sized such that the body will fit within the jacket, such that the plurality of attachment points are proximate to or are abutting against the plurality of receiving points such that they can be attached via a friction fit, overmolding process, or an adhesive.

The center has an upper opening equipped with a first attachment mechanism, a bottom opening equipped with a third attachment mechanism, a curved interior wall surrounding by a plurality of exterior walls, where both of these walls extend from the upper opening to the bottom opening. Preferably, the third attachment mechanism will extend beyond the bottom opening and the second attachment mechanism will extend beyond the upper opening.

The cap has a top surface and a fourth attachment mechanism below the top surface, where the fourth attachment mechanism is configured to releasably attach to the first attachment mechanism. In some embodiments, the top surface has a recessed which is sized to create a limited friction fit with a removable label which integrates with the cap.

In various embodiments, the container in accordance with the present disclosure is equipped with a pump section to allow for the easy dispensing of liquids and other fluids which are stored within said container. The pump section is comprised of an actuator having an inlet and an outlet, a pump housing containing a pump, the pump housing sitting beneath the actuator, a platform within the pump housing, which sits beneath the actuator, which abuts against the pump, and a track which abuts against the pump housing and releasably attaches to the first attachment mechanism, where the actuator, pump, and cavity are all in fluid communication with each other.

In another highly preferred embodiment, the actuator can be extended beyond the pump housing through the use of a twist-and-rise mechanism, and can be withdrawn into the pump housing through the use of that same twist-and-rise elevator. One benefit of this system is that it serves to protect the actuator during travel.

The present disclosure also contemplates interlocking reusable spill-proof containers that are equipped with multiple cavities so that a user can store multiple products within the same container, without the products coming into contact with each other. In some of these embodiments, the container comprises a center, a first portion, a second portion, a first cap and a second cap.

The center has a first well defined by a first bottom and a first opening equipped with a first attachment mechanism, and a second well defined by a second bottom and a second opening equipped with a second attachment mechanism, where the first bottom and second bottom are proximate to each other.

The first portion has a first end and a second end, the first end having a means for releasably attaching to the first attachment mechanism and a first member such that when the first portion is attached to the center portion, the first member creates a fluid-impermeable seal with the first opening. The second end has a third well with a third bottom and third opening equipped with a third attachment mechanism.

The second portion has a third end and a fourth end, the third end having a means for releasably attaching to the second attachment mechanism and a second member. When the second portion is attached to the center portion via the second attachment mechanism, the second member creates a fluid-impermeable seal with the second opening. The fourth end has a fourth well with a fourth bottom and fourth opening equipped with a fourth attachment mechanism. The first cap has a means for releasably attaching with the third attachment mechanism and a means for creating a fluid-impermeable seal with the third opening when attached thereto. The second cap has a means for releasably attaching with the fourth attachment mechanism and a means for creating a fluid-impermeable seal with the fourth opening when attached thereto.

Similarly to the single-cavity embodiments, the multiple cavity embodiments can also be equipped with one or more pump sections. Each of these pump sections comprises an actuator having an inlet and an outlet, a pump housing containing a pump, the pump housing sitting beneath the actuator, a platform within the pump housing, which sits beneath the actuator, which abuts against the pump, and a track which abuts against the pump housing and releasably attaches to the third attachment mechanism, where the actuator, pump, and first well are all in fluid communication with each other.

In various embodiments, multiple containers in accordance with the present disclosure are bundled together to form a kit. In these embodiments, the magnets contained in each of the containers are used to attach one container to another, such that a bundle of containers can be conveniently transported.

The present disclosure provides for a leak-proof, spill-proof interlocking travel container for storing and dispensing liquid and/or solid cosmetic products and toiletries. Depending on the embodiment, the container may have a single vessel, one or more twist-and-rise pumps, and a removable petri dish for collecting the "last drop" of a product and for minimizing waste. These containers are cleanable, reusable, refillable, and are sized for day-use, overnight stays, and longer travel, all while being TSA-compliant. Preferably, these containers are primarily of recycled ocean-bound plastic. The bottles are optionally provided in radially hexagonal or triangle shapes and are connectible by magnets. This invention provides combo bottles with 2-4 or even more bottles combined together as one pod. This invention also provides methods for making and using the containers in accordance with the present disclosure.

It is an object of the invention in accordance with the present disclosure to provide one or more containers that can be removably attached for ease, efficiency, and aesthetic benefits.

It is an object of the invention in accordance with the present disclosure to provide containers with wide openings and shallow cavities.

It is an object of the invention in accordance with the present disclosure to provide a container that allows for the entirety of the contents of the container to be easily accessed.

It is an object of the invention in accordance with the present disclosure to provide a container that has a geometry that minimizes dead space when multiple containers are releasably attached to one another.

It is an object of the invention in accordance with the present disclosure to provide containers that are constructed substantially from recycled materials.

It is an object of the invention in accordance with the present disclosure to provide a container that can separately house multiple cosmetic products.

It is an object of the invention in accordance with the present disclosure to provide a container having an integrated customizable label.

It an object of the invention in accordance with the present disclosure to provide a container for containing and dispensing fluids such as low viscosity liquids, medium viscosity liquids, high viscosity liquids, as well as semi-solid products and solid products.

The present invention and its embodiments meets and exceeds these objectives.

While these units may be suitable for the particular purpose employed, or for general use, they would not be as suitable for the purposes of the present disclosure as disclosed hereafter.

In the present disclosure, where a document, act, or item of knowledge is referred to or discussed, this reference or discussion is not an admission that the document, act, item of knowledge, or any combination thereof that was known at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed. It is contemplated that the claims may encompass one or more of the conventional technical aspects discussed herein.

However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

Implementations may include one or a combination of any two or more of the aforementioned features.

These and other aspects, features, implementations, and advantages can be expressed as methods, apparatuses, systems, components, program products, business methods, and means or steps for performing functions, or some combination thereof.

Other features, aspects, implementations, and advantages will become apparent from the descriptions, the drawings, and the claims.

BRIEF DESCRIPTION OF THE PREFERRED EMBODIMENTS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete, and fully conveys the scope of the present disclosure to those skilled in the art. In fact, it will be apparent to those skilled in the art that various modifications and variations can be made in the present invention without departing from the scope or spirit of the invention.

DETAILED DESCRIPTION OF THE PREFERRED EMBODIMENTS

Figure 1A:
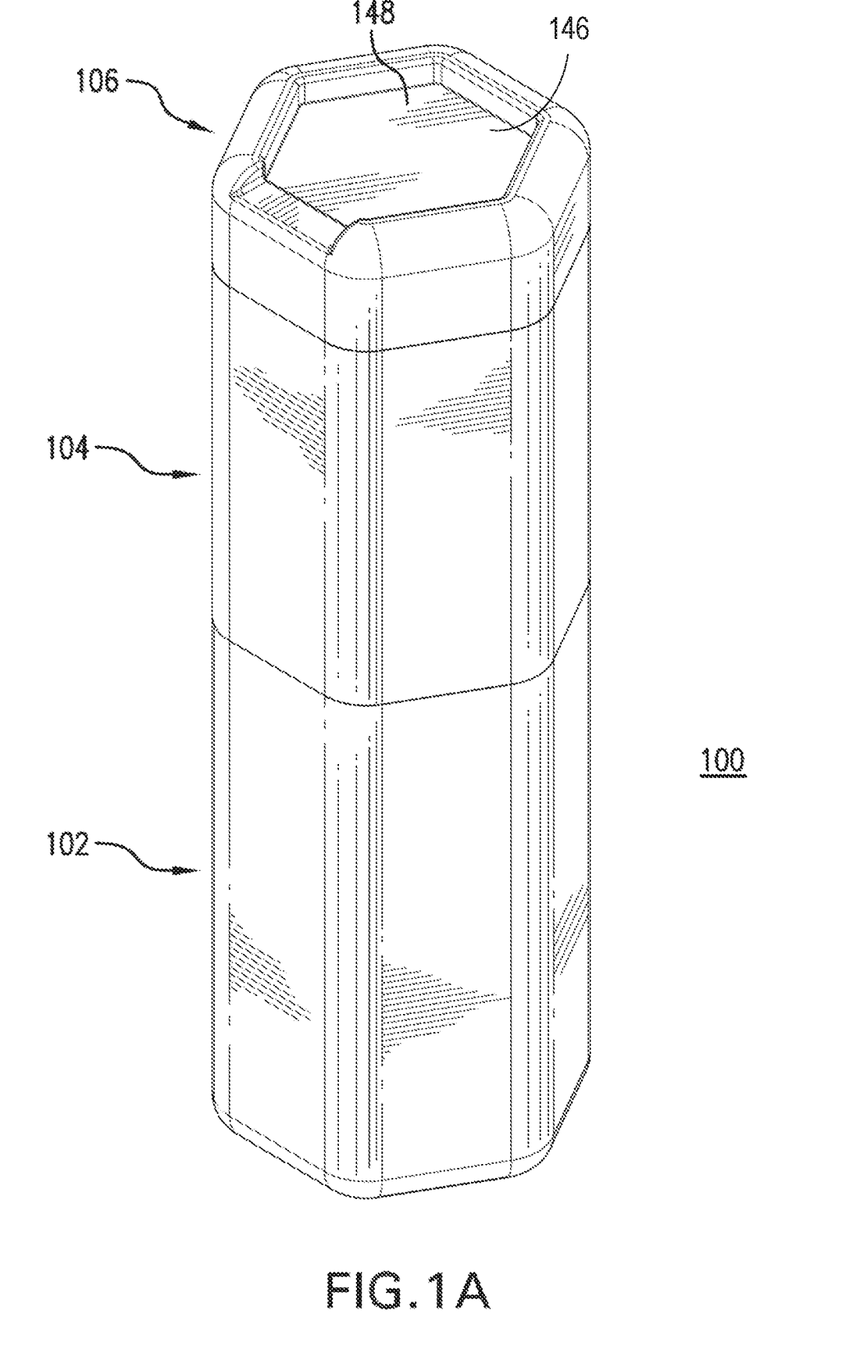
FIG. 1A is a perspective view of a single-cavity embodiment of a container in accordance with the present disclosure.
Figure 1B:
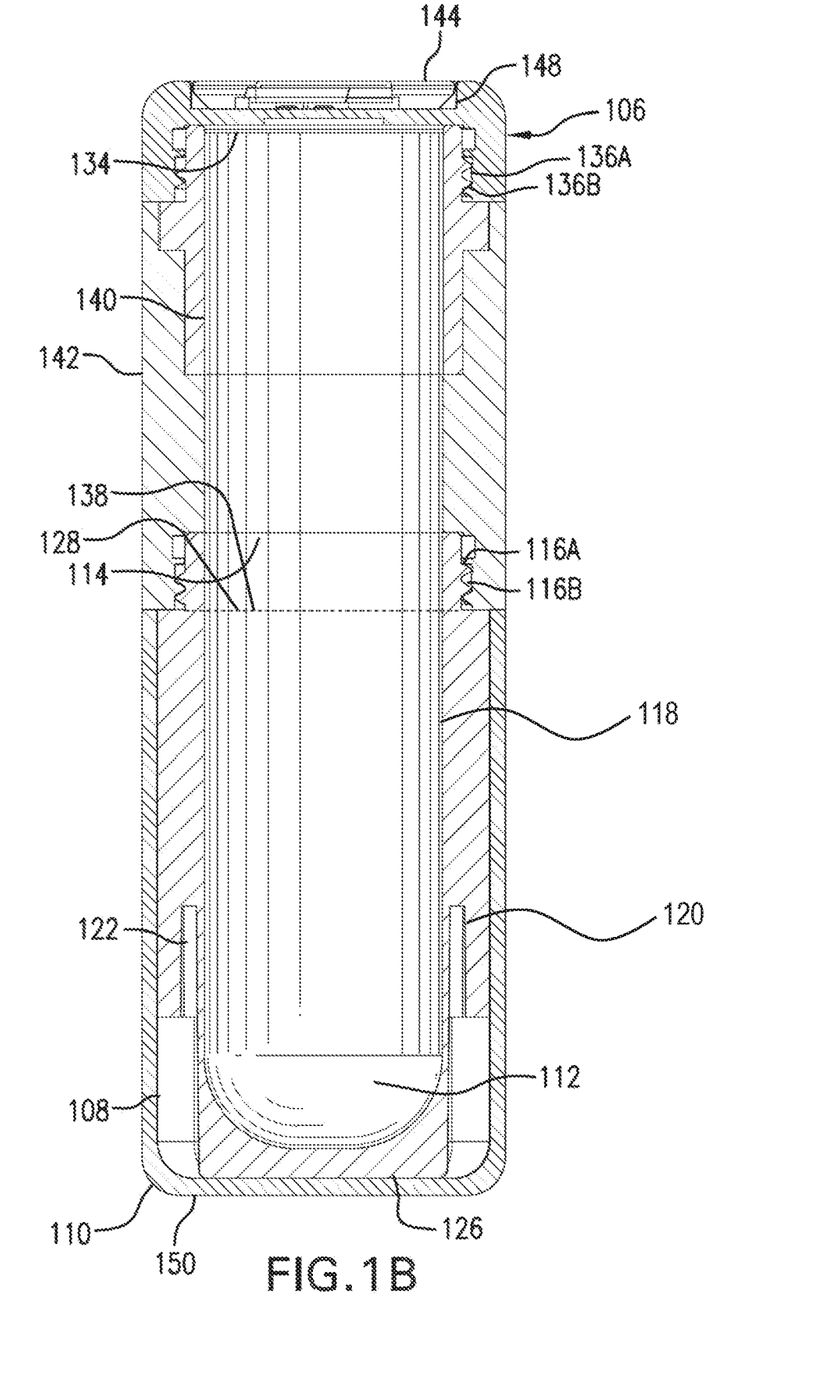
FIG. 1B is a cross-sectional view of the embodiment shown in FIG. 1A.

FIGS. 1A and 1B illustrate a single-cavity embodiment of a container in accordance with the present disclosure.

Referring to FIG. 1A, an interlocking reusable spill-proof container 100 is shown. Here, container 100 features a petri 102, a center 104, and a cap 106 having a top recess 148. Additional structure of these components can be seen in FIG. 1B. Specifically, FIG. 1B. shows that the petri 102 has both a body 108 and a jacket 110 which partially envelops the body 108. The body 108 is constructed out of a cavity 112, which has a top opening 114, a bottom 126, and a plurality of walls 118 extending therebetween. Each of the plurality of walls 118 is equipped with a recess 120 wherein a magnet 122 is located. In some embodiments, only one of the plurality of walls 118 is equipped with the magnet 122. In other embodiments more than one of the plurality of walls 118 but less than all of the plurality of walls 118 will be equipped with the magnet 122. At the intersection of each of the plurality of walls 118 an attachment point is formed which is used to interface with the jacket 110. The body 108 is also equipped with a first attachment mechanism 116A, which extends beyond the top opening 114.

The jacket 110 has a floor 150 which sits beneath the bottom 126, a top hole 128, and a plurality of edges that extend between the floor 150 and the top hole 128. The top hole 128 is level with the top opening 114, which both sit just beneath the first attachment mechanism 116A. Here the first attachment mechanism 116A is equipped with male threads to interface with corresponding female threads, but other methods of attachment are suitable for use with the first attachment mechanism 116A.

The container 100 shown in FIGS. 1A and 1B also includes a center 104. The center 104 has an upper opening 134 equipped with a second attachment mechanism 136A. The center 104 shown here also has a bottom opening 138, which is equipped with a third attachment mechanism 116B, which interfaces with the first attachment mechanism 116A. Preferably, the bottom opening 138, the top opening 114, and the top hole 128 are sized to create a substantially smooth juncture when the petri 102 and the center 104 are attached. The center 104 also has a plurality of exterior walls 142 which extend between the upper opening 134 and the bottom opening 138. Also extending between the upper opening 134 and the bottom opening 138, but within the plurality of exterior walls 142 is a curved interior wall 140 which will create a continuous service with the cavity 112 when the center 104 is attached to the petri 102.

The cap 106 includes a top surface 146, which is equipped with a top recess 148 sized to receive a label 144. Preferably, the label 144 is removably attached to the cap 106 through magnets. Alternatively, the label 144 can be removably attached to the cap 106 through a limited friction fit with the top recess 148. In a variety of embodiments, the label 144 has a means for customizing said label such that a user may indicate the contents of the container 100. In some embodiments, this customization is permanent and in other embodiments the customization is reversable such that it can be customized and re-customized depending on the contents of the container 100. In some embodiments, the label 144 is removably attached to the cap 106 through the use of a hinge contained on the top surface 146.

The cap 106 is also equipped with a fourth attachment mechanism 136B, which is used to provide for the removable attachment to the center 104 via the second attachment mechanism 136A. In the embodiment shown here, the fourth attachment mechanism 136B is equipped with male threads to interface with corresponding female threads, but other methods of attachment are suitable for use with the fourth attachment mechanism 136B.

While FIG. 1A shows this embodiment of the container 100 without a label 144, FIG. 1B shows the embodiment with label 144 integrated therein and placed within the top recess 148. Note that while not pictured here, the cap 106 can interface directly with the petri 102 by interfacing the first attachment mechanism 116A with the fourth attachment mechanism 136B. In highly preferred embodiments, all attachment mechanisms used for interfacing a petri 102, a center 104, and/or a cap 106 shall be interchangeable. When any of the first attachment mechanism 116A, the second attachment mechanism 116B, the third attachment mechanism 136A, and/or the fourth attachment mechanism 136B are attached to each other, a seal is formed such that fluids will be contained within the container 100. In some embodiments, any or all of the first attachment mechanism 116A, the second attachment mechanism 116B, the third attachment mechanism 136A, and/or the fourth attachment mechanism 136B are equipped with one or more O-rings to aid with the aforementioned sealing. In a highly preferred embodiment, the first attachment mechanism 116A, the second attachment mechanism 116B, the third attachment mechanism 136A, and/or the fourth attachment mechanism 136B all comprise a twisting or screwing/unscrewing mechanism to provide for the releasable attachment thereof.

In various embodiments, the cavity 112 is sized such that a human finger can scrape out any fluids, solids, or semi-solids stored within the cavity 112. These embodiments are especially useful when high-viscosity liquids are contained within the container 100. Other embodiments exist where the cavity 112 is sized smaller than a human finger and is optionally coupled with a scaping tool such as a spatula. Preferably, the cavity 112 and the curved interior wall 140 have a smooth texture.

Figure 2A:
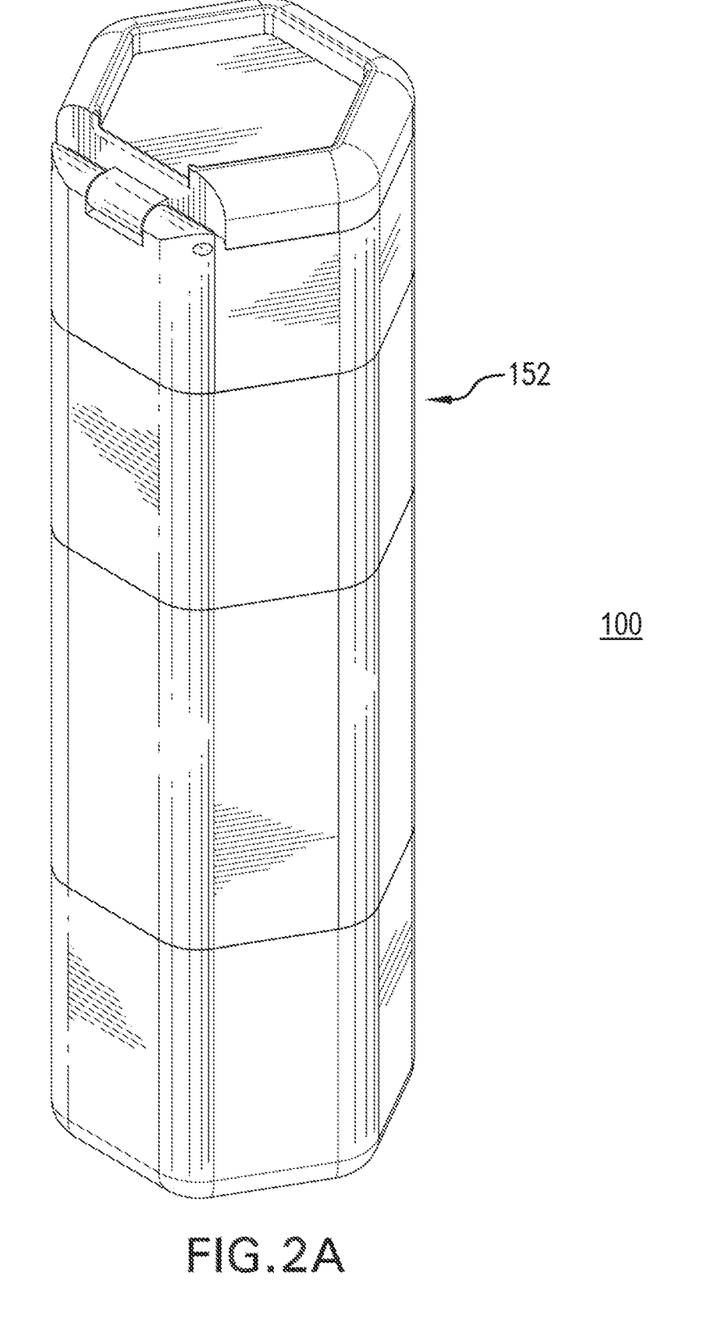
FIG. 2A is a perspective view of a single-cavity embodiment of a container equipped with a pump section in accordance with the present disclosure.
Figure 2B:
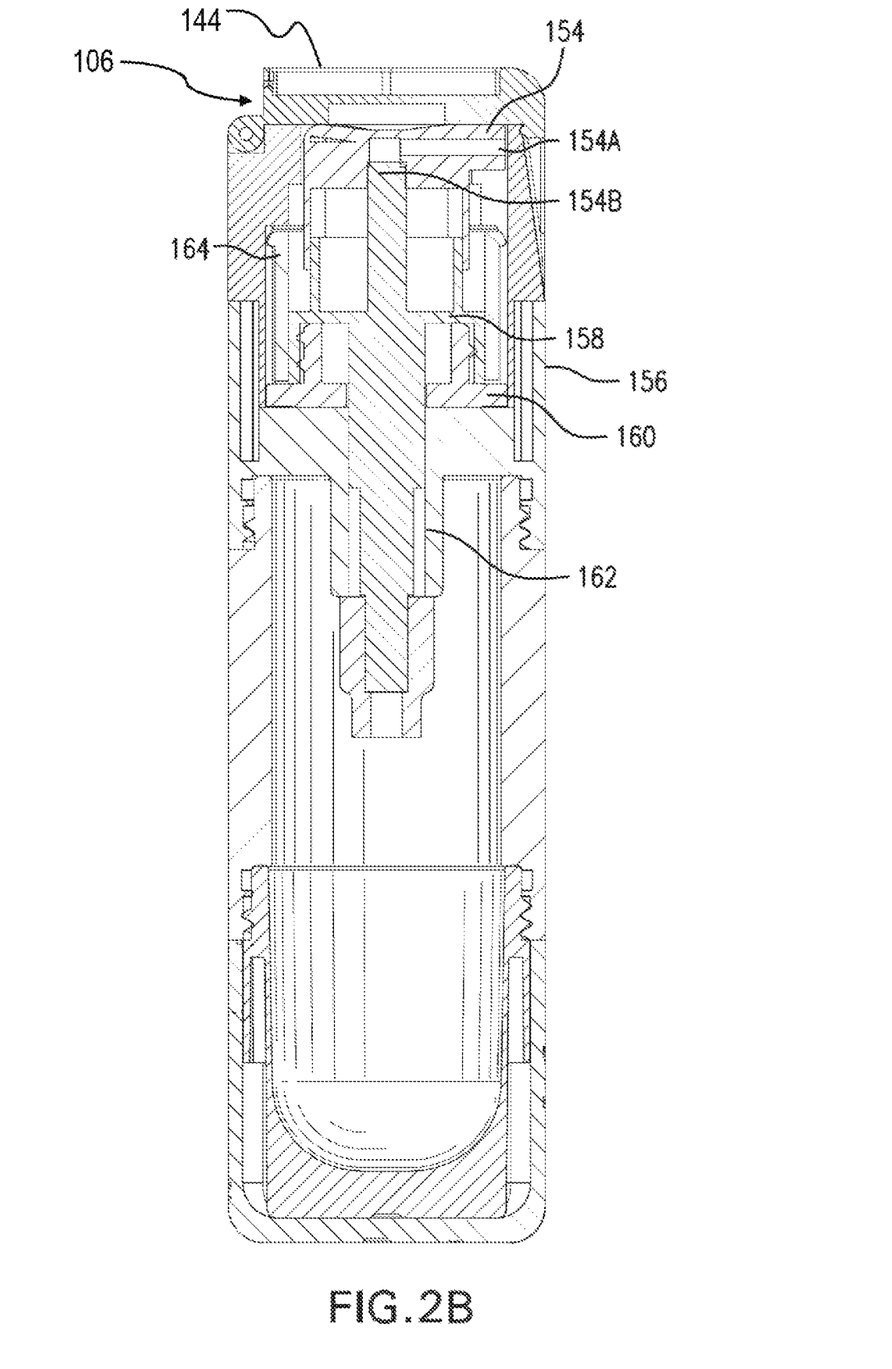
FIG. 2B is a cross-sectional view of the embodiment shown in FIG. 2A.

FIGS. 2A and 2B show a single-cavity embodiment of the container 100, equipped with a pump section 152 to aid with the dispensing of low-viscosity fluids contained within the container 100. Referring to FIG. 2B, the components of the pump section 152 are shown. Here, the pump section 152 has an actuator 154, a pump housing 156 which contains a pump 158 and a platform 160. The pump section 152 also includes a track 162 and an integrated twist-and-rise mechanism 164.

Here, the actuator 154 has an inlet 154A for receiving fluid contained within the container 100, and an outlet 154B for dispensing said fluid. To operate the embodiment of the container 100 shown in FIGS. 2A and 2B, one must first expose the actuator 154 by removing the label 144 from the cap 106. In some embodiments, where the label 144 is attached magnetically or through a limited friction fit, the label 144 must be removed entirely for the container 100 to operate. In other embodiments, where the label 144 is attached to the cap 106 via a hinge, the label 144 merely need be rotated away from the cap 106 to expose the actuator 154. The track 162 is used to help guide the actuator 154 while being depressed, and in some embodiments, to assist the twist-and-rise mechanism 164 with its operation. In some embodiments, the track 162 is equipped with a horizontal ridge which is used to keep the twist-and-rise mechanism 164 in place, which saves space over traditional pumps.

Once the actuator 154 is exposed, it must be raised above the pump section 152 by engaging the twist-and-rise mechanism 164. By twisting the twist-and-rise mechanism 164, the actuator 154 and the platform 160 are raised such that the actuator 154 can be depressed against the platform 160 to engage the pump 158, while the outlet 154B remains above the pump section 152, to allow for proper dispensing. A benefit of incorporating the twist-and-rise mechanism 164 is that the container 100 cannot be accidently bumped and pumped causing the accidental disposal of the contents of the container 100. Not shown here is a dipstick which is in fluid communication with the pump 158 to allow the pump 160 to access fluids stored within the cavity 112. In many embodiments that incorporate a dipstick, the dipstick rests snugly within the pump section 154 such that the pump 158 can be operated without any leaking occurring. Of note is that even if the dipstick does not extend to the bottom of the cavity 112, because the petri 102 is removable a user can still collect the remaining product contained within said cavity.

In alternate embodiments, the pump 158 contains a collar and a dipstick, all of which are supported on the platform 160. In some embodiments, the pump 158 further comprises one or more check valves to prevent accidental leakage. In these embodiments the check valve(s) are engaged when the actuator 154 is not exposed and is completely contained within the pump section 152. In other embodiments, the petri 102 (see FIG. 1A) has a height that is equal to the distance traveled by the actuator 154 when the twist-and-rise mechanism 164 is engaged.

Figure 3A:
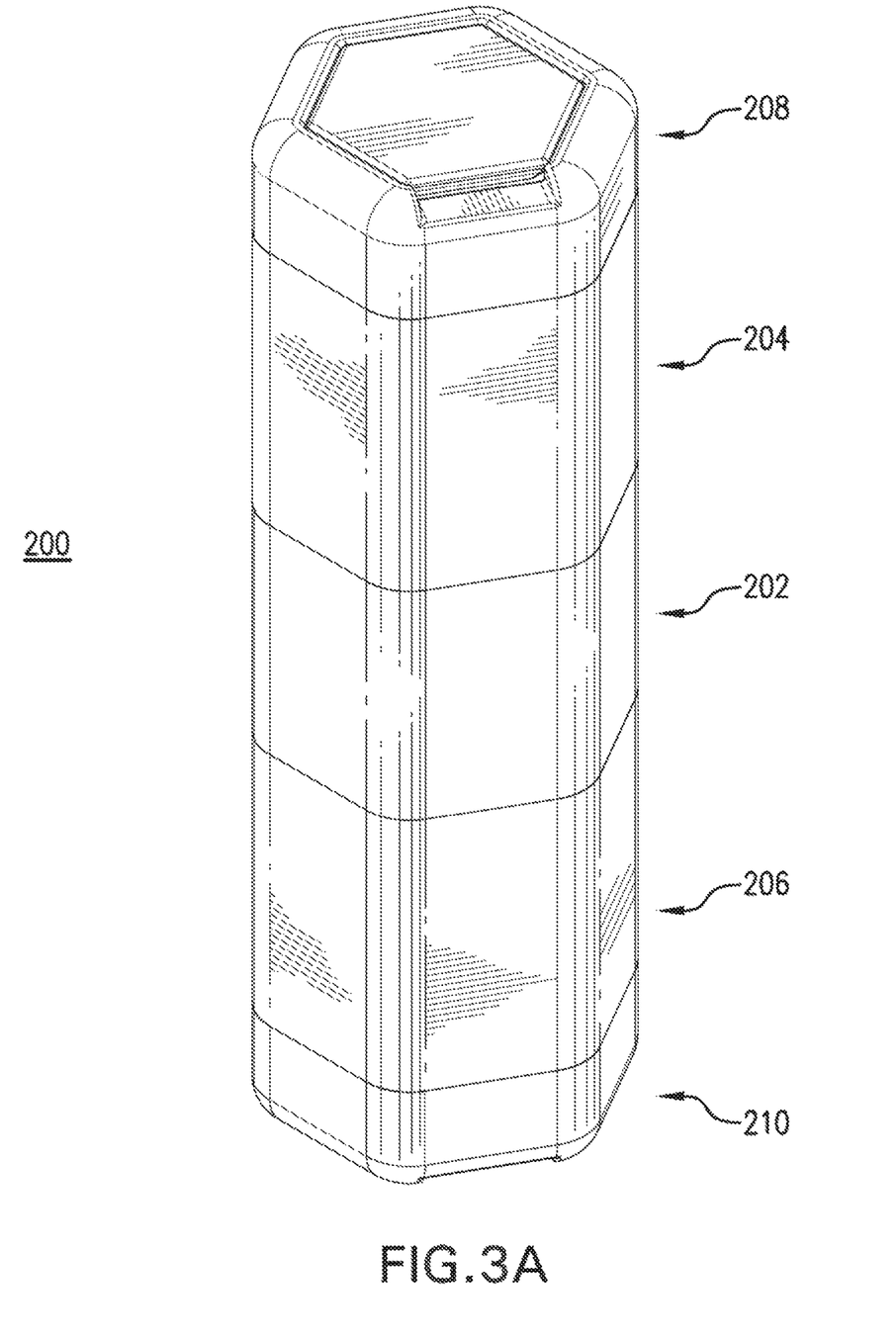
FIG. 3A is a perspective view of a multiple-cavity embodiment of a container in accordance with the present disclosure.
Figure 3B:
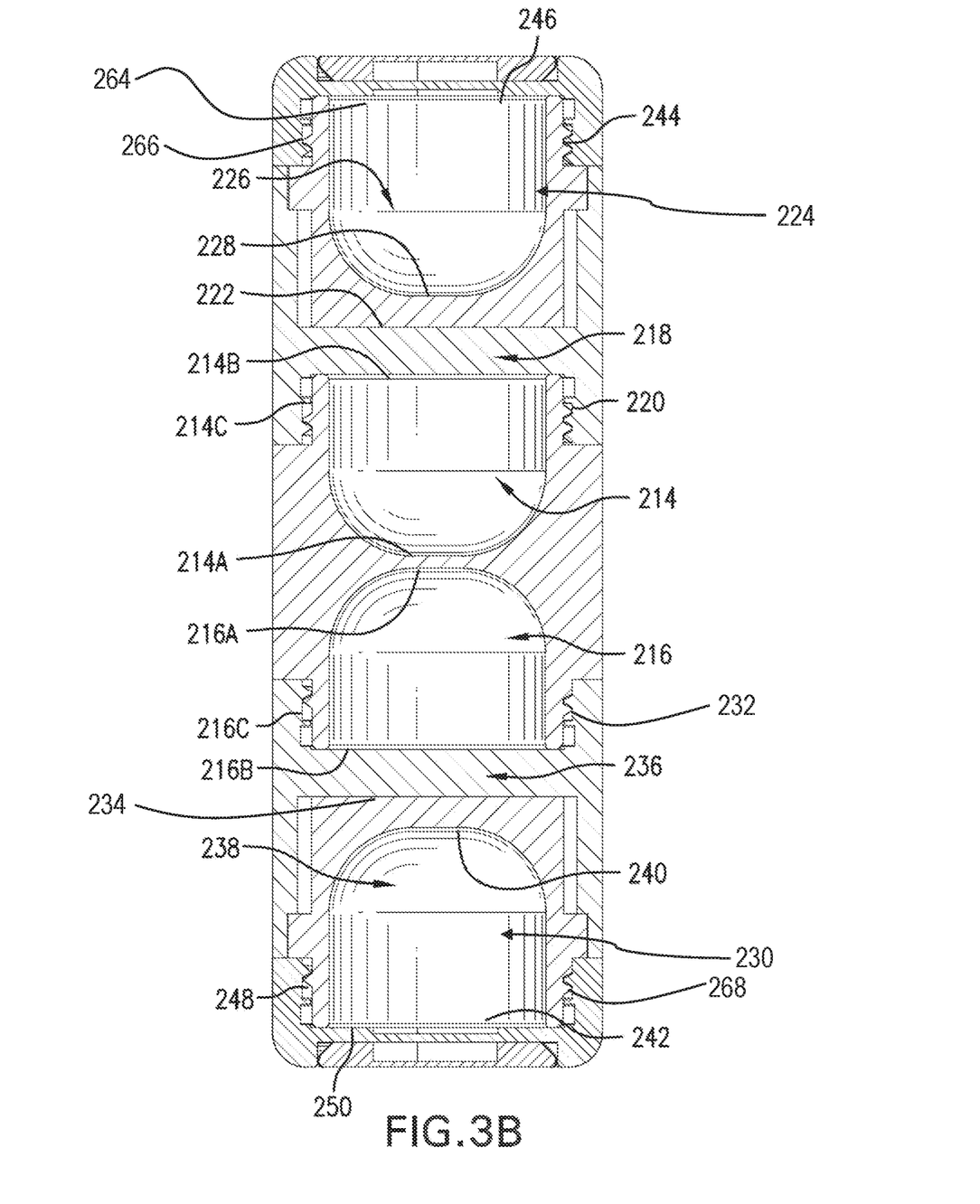
FIG. 3B is a cross-sectional view of the embodiment shown in FIG. 3A.

FIGS. 3A and 3B show a multi-chamber embodiment of the container in accordance with the present invention. Here, the container 200 has a center portion 202, a first portion 204, a second portion 206, a first cap 208, and a second cap 210.

The center portion 202 has a first well 214 which is formed by a first bottom 214A and culminates in a first opening 214B, which is equipped with a first attachment mechanism 214C that extends beyond the second opening 214B. The center portion 202 also has a second well 216 which is formed by a second bottom 216A and culminates in a first opening 216B, which is equipped with a second attachment mechanism 216C that extends beyond the second opening 216B. The first bottom 214A and the second bottom 216A are proximate to one another, but the first opening 214B and the second opening 216B are faced in directly opposite directions.

The first portion 204 has a first end 218 which is comprised of a first member 222 and a means for releasable attachment 220, and a second end 224 which is comprised of a third well 226. The third well 226 is formed by a third bottom 228 and culminates in a third opening 264 which is equipped with a third attachment mechanism 266 that extends beyond the third opening 264. In many embodiments, the first portion 204 also has a plurality of external walls beyond the first well 214, and a plurality of magnets embedded in between the first well 214 and the plurality of external walls, such that the magnets can generate a magnetic field beyond said plurality of external walls.

The second portion 206 has a third end 230 which is comprised of a third member 234 and a means for releasable attachment 232, and a fourth end 236 which is comprised of a fourth well 238. The fourth well 238 is formed by a fourth bottom 240 and culminates in a fourth opening 242 which is equipped with a fourth attachment mechanism 268 that extends beyond the fourth opening 242. In many embodiments, the second portion 206 also has a plurality of external walls beyond the fourth well 238, and a plurality of magnets embedded in between the fourth well 238 and said plurality of external walls, such that the magnets can generate a magnetic field beyond said plurality of external walls.

The first cap 208 has a means for releasable attachment 244 and a means for generating a fluid-impermeable seal 246. The means for releasable attachment 244 can be achieved in a variety of ways. Preferably, releasable attachment of the first cap 208 to either the third attachment mechanism 266 or the fourth attachment mechanism 268 will be through the use of male and female screw threads such that the first cap 208 can be releasably screwed on or unscrewed from either the third attachment mechanism 266 or the fourth attachment mechanism 268. Alternatively, the means for releasable attachment 244 can also operate through a limited friction fit between the first cap 208 and the third attachment mechanism 266 or the fourth attachment mechanism 268.

The means for generating a fluid-impermeable seal 246 operates by creating a seal along the third opening 264 by firmly pressing a rigid member against the third opening 264. In some embodiments, this seal is supplemented through the use of an O-ring.

The first cap 208 includes a top surface, which is equipped with a recess sized to receive a label in accordance with the present disclosure. Preferably, the label is removably attached to the cap through magnets. Alternatively, the label can be removably attached to the cap through a limited friction fit with the recess. In a variety of embodiments, the label has a means for customizing said label such that a user may indicate the contents of the container 200. In some embodiments, this customization is permanent and in other embodiments the customization is reversable such that it can be customized and re-customized depending on the contents of the container 200. In some embodiments, the label is removably attached to the cap through the use of a hinge contained on the top surface.

The second cap 210 has a means for releasable attachment 248 and a means for generating a fluid-impermeable seal 250. The means for releasable attachment 248 can also be achieved in a variety of ways. Preferably, releasable attachment of the second cap 210 to either the third attachment mechanism 266 or the fourth attachment mechanism 268 will be through the use of male and female screw threads such that the second cap 210 can be releasably screwed on or unscrewed from either the third attachment mechanism 266 or the fourth attachment mechanism 268. Alternatively, the means for releasable attachment 248 can also operate through a limited friction fit between the second cap 210 and the third attachment mechanism 266 or the fourth attachment mechanism 268.

The means for generating a fluid-impermeable seal 246 operates by creating a seal along the fourth opening 242 by firmly pressing a rigid member against the fourth opening 242. In some embodiments, this seal is supplemented through the use of an O-ring.

The second cap 210 includes a top surface, which is equipped with a recess sized to receive a label. Preferably, the label is removably attached to the cap through magnets. Alternatively, the label can be removably attached to the cap through a limited friction fit with the recess. In a variety of embodiments, the label has a means for customizing said label such that a user may indicate the contents of the container 200. In some embodiments, this customization is permanent and in other embodiments the customization is reversable such that it can be customized and re-customized depending on the contents of the container 200. In some embodiments, the label is removably attached to the cap through the use of a hinge contained on the top surface.

Figure 4A:
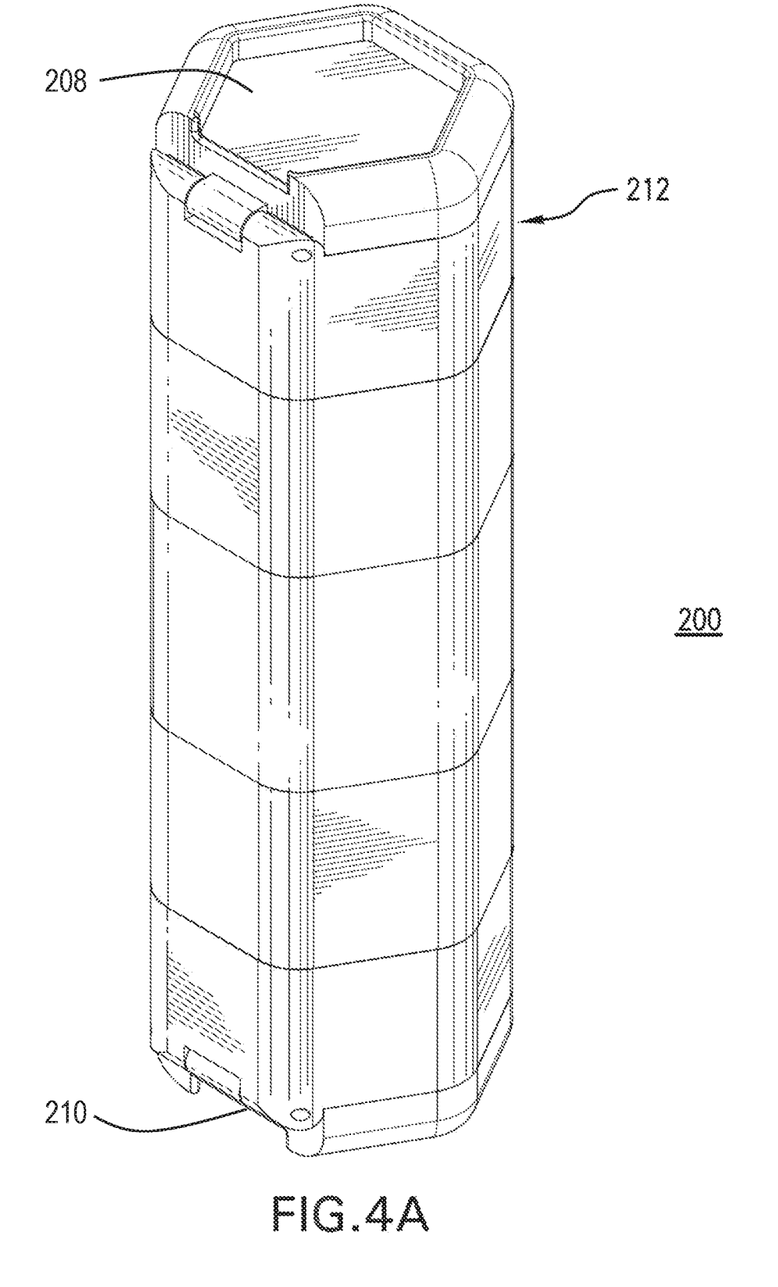
FIG. 4A is a perspective view of a multiple-cavity embodiment of a container equipped with a pump section in accordance with the present disclosure.
Figure 4B:
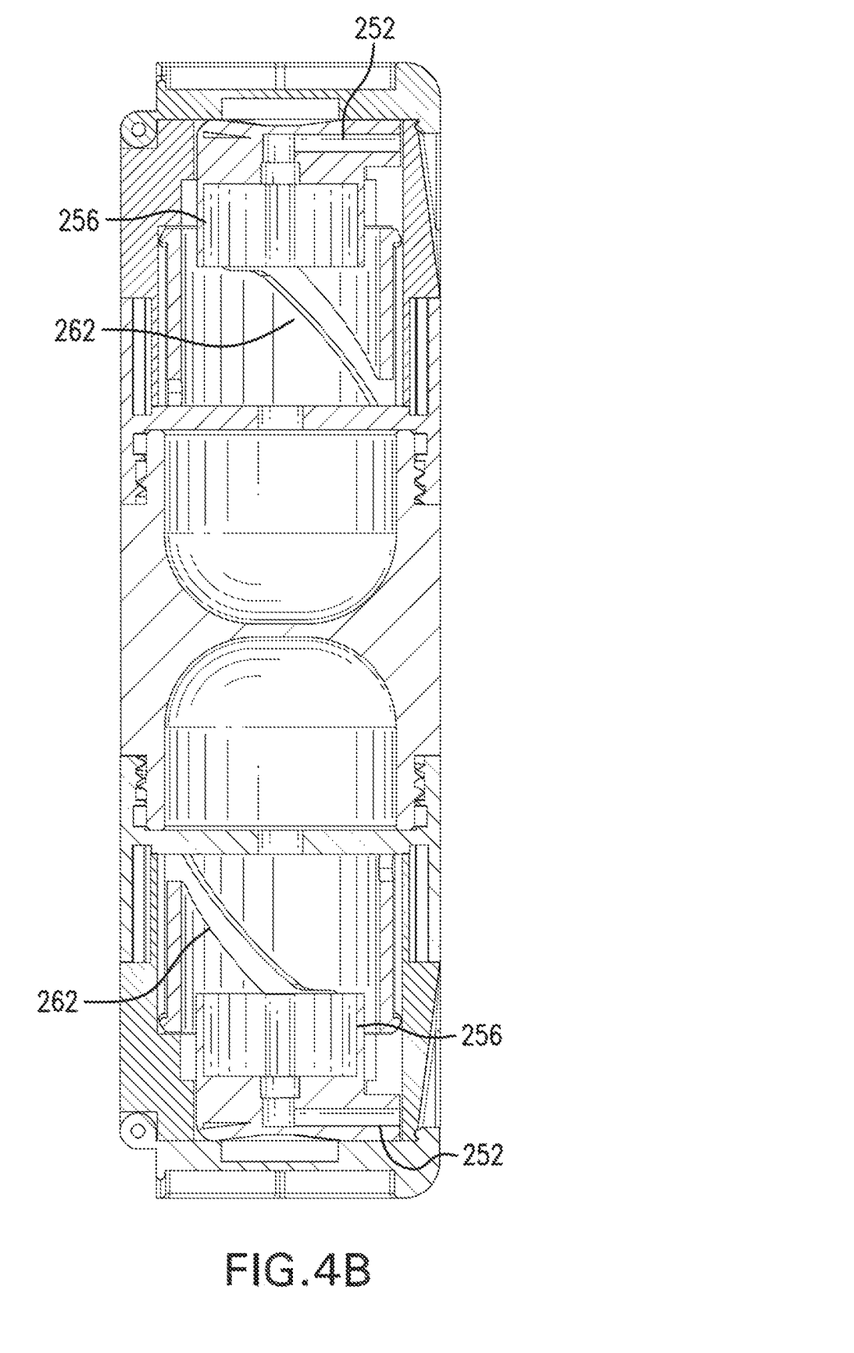
FIG. 4B is a cross-sectional view of the embodiment shown in FIG. 4A.

FIGS. 4A and 4B. show a multi-chambered embodiment of the container 200 in accordance with the present invention equipped with two pump sections 212. Similarly to the embodiment shown in FIGS. 3A and 3B, this embodiment of the container 200 has a center portion as described above. However, in lieu of the first portion and second portion of the embodiment of FIGS. 3A and 3B, the embodiment shown here includes two of the pump sections 212.

As in the embodiment shown by FIGS. 2A and 2B, each pump section 212 has an actuator 252, a pump housing which contains a pump 256 and a platform. The pump section also includes a track and an integrated twist-and-rise mechanism 262.

Here, the actuator 252 has an inlet for receiving fluid contained within the container 200, and an outlet for dispensing said fluid. To operate the embodiment of the container 200 shown in FIGS. 4A and 4B, one must first expose the actuator 252 by removing the label from either the first cap 208 or the second cap 210, depending on which pump 256 is being operated. In some embodiments, where the label is attached magnetically or through a limited friction fit, the label must be removed entirely for the container 200 to operate. In other embodiments, where the label is attached to either the first cap 208 or the second cap 210 via a hinge, the label merely need be rotated away from said caps to expose the actuator 252. The track is used to help guide the actuator 252 while being depressed, and in some embodiments, to assist the twist-and-rise mechanism 262 with its operation. In some embodiments, the track is equipped with a horizontal ridge which is used to keep the twist-and-rise mechanism 262 in place, which saves space over traditional pumps.

Once the actuator 252 is exposed, it must be raised above the pump section by engaging the twist-and-rise mechanism 262. By twisting the twist-and-rise mechanism 262, the actuator 252 and the platform are raised such that the actuator 252 can be depressed against the platform to engage the pump 256, while the outlet remains above the pump section 212, to allow for proper dispensing. Not shown here is a dipstick which is in fluid communication with the pump 256 to allow the pump 256 to access fluids stored within either first well 214 or the second well 216. In many embodiments that incorporate a dipstick, the dipstick rests snugly within the pump section such that the pump 256 can be operated without any leaking occurring. Of note is that even if the dipstick does not extend to the bottom of the first well 214 or the second well 216, because the center portion 202 is removable, a user can still collect the remaining product contained within said cavity.

In alternate embodiments, the pump 256 contains a collar and a dipstick, all of which are supported on the platform. In some embodiments, the pump 256 further comprises one or more check valves to prevent accidental leakage. In these embodiments the check valve(s) are engaged when the actuator 252 is not exposed and is completely contained within the pump section. In other embodiments, both the first well 214 and the second well 216 (see FIG. 3B) have a height that is equal to the distance traveled by the actuator 252 when the twist-and-rise mechanism 262 is engaged.

In many embodiments, the pump section 212 also has a plurality of external walls beyond the pump housing, and a plurality of magnets embedded in between the pump housing and the plurality of external walls, such that the magnets can generate a magnetic field beyond said plurality of external walls.

In a variety of embodiments, containers in accordance with the present disclosure are capable of standing upright by balancing on a cap attached to the container. In other embodiments, to the extend any component with an attachment mechanism or means for attachment are sized to interface with each other, new combinations of components can be generated except where an attached dipstick would extend too far into a well or cavity.

Further, the present disclosure contemplates a broad range of container size, cavity size, and well size, including those that are less than 1 oz to sizes of about 1 oz to 3.4 oz, 8 oz to 12 oz, 16 oz to 32 oz and larger, as well as many sizes in between. Moreover, due to the inclusion of magnets in most of the components listed above, it is possible to attach a component while in use to a separate, closed container. This will assist with preventing spills.

It is anticipated that one or more of the embodiments disclosed herein shall be used in conjunction with each other. As such, the present disclosure also contemplates kits of various embodiments of containers to assist users with a variety of travel needs with regard to toiletries, cosmetics, and similar solid, semi-solid, and fluid products.

Preferably, the containers described in accordance with the present disclosure shall have a geometry that when multiple containers are combined with pods through the embedded and integrated magnets, they shall form an interlocking pattern with little to no empty space therein. Such shapes include hexagons and triangles.

In a highly preferred embodiment, the containers in accordance with the present disclosure shall be constructed out of recycled ocean-bound plastic.

In various embodiments, the containers in accordance with the present invention will be filled with products selected from the group consisting of: shampoo, conditioner, hair oil, hair mask, scalp oil, scalp exfoliator, liquid eye makeup remover, micellar water, makeup remover wipes, solid face cleanser, liquid face cleanser, toner, serums, scrubs, peels, masks, solid sheet masks, liquid spot treatment, solid spot treatment dots, manuka honey, medicated creams, pomades, moisturizers, shaving cream, liquid body wash, solid body wash, liquid body exfoliator, liquid body scrub, solid body exfoliator, solid body scrub, body oils, body lotions, body moisturizers, body creams, solid perfumed, hand creams, hand moisturizers, hand sanitizers, cotton swabs, tissues, vitamins, supplements, and medications.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," and "third," are used herein to describe various elements, components, regions, layers and/or sections, these elements, components, regions, layers and/or sections should not be limited by these terms. These terms are only used to distinguish one element, component, region, layer and/or section from another element, component, region, layer and/or section. Thus, a "first element," "component," "region," "layer" and/or "section" discussed below could be termed a second element, component, region, layer and/or section without departing from the teachings herein.

Features illustrated or described as part of one embodiment can be used with another embodiment and such variations come within the scope of the appended claims and their equivalents.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

In conclusion, herein is presented an interlocking reusable spill-proof container. More particularly, the present disclosure relates to an interlocking reusable spill-proof travel bottle that can house a cosmetic or personal care product, or separately house multiple cosmetics or personal care products, depending on the embodiment. The disclosure is illustrated by example in the drawing figures, and throughout the written description. It should be understood that numerous variations are possible while adhering to the inventive concept. Such variations are contemplated as being a part of the present disclosure.

What is claimed is:

1. A kit comprising a plurality of interlocking spill-proof containers including a first container and a second container, wherein each spill-proof container comprises:
   a petri,
      wherein the petri includes a body and a jacket,
      wherein the jacket at least partially envelops the body,
      wherein the body has a top opening, at least one cavity, and a bottom, and
      wherein the body contains at least one magnet; and
   a cap,
      wherein the jacket and cap each has a plurality of exterior walls, each plurality of exterior walls forming a hexagon; and
      wherein the first and second containers are releasably attached to each other via the magnets contained by the first and second containers.

2. The kit of claim 1, further comprising a third container, wherein the third container is releasably attached to at least one of the first and second containers via a magnet contained in the third container and at least one of the magnets contained in the first and second containers.

3. The kit of claim 2, further comprising a fourth container, wherein the fourth container is releasably attached to at least one of the first, second, and third containers via a magnet contained in the fourth container and at least one of the magnets contained in the first, second, and third containers.

4. The container of claim 1,
   wherein each cap has a top surface that includes a recess, and
   wherein the recess is sized to receive a label.

5. The container of claim 4,
   wherein the label is magnetically attached to the top surface of the cap.

6. The container of claim 4,
   wherein the label is customizable by a user of the container.

7. The container of claim 4,
   wherein the recess of the cap is hexagonal in shape,
   wherein the recess is bounded by a plurality of inner walls, and
   wherein at least one of the inner walls is removed to provide access to a lower portion of the label.

* * * * *